(12) United States Patent
McCarthy

(10) Patent No.: US 12,182,232 B2
(45) Date of Patent: Dec. 31, 2024

(54) VERIFYING, MONITORING, AND TOKENIZING DIGITAL ASSETS AS PROOF OF OWNERSHIP AND VALUATION OF THE DIGITAL ASSETS

(71) Applicant: TULIP DIGITAL ASSET EXCHANGE, INC., Quincy, MA (US)

(72) Inventor: Paul McCarthy, Milton, MA (US)

(73) Assignee: TULIP DIGITAL ASSET EXCHANGE, INC., Quincy, MA (US)

( * ) Notice: Subject to any disclaimer, the term of this patent is extended or adjusted under 35 U.S.C. 154(b) by 332 days.

(21) Appl. No.: 17/745,777

(22) Filed: May 16, 2022

(65) Prior Publication Data

US 2022/0366021 A1   Nov. 17, 2022

Related U.S. Application Data

(60) Provisional application No. 63/256,109, filed on Oct. 15, 2021, provisional application No. 63/221,199, filed on Jul. 13, 2021, provisional application No. 63/189,624, filed on May 17, 2021.

(51) Int. Cl.
| | |
|---|---|
| *G06F 21/16* | (2013.01) |
| *G06F 21/33* | (2013.01) |
| *H04L 9/00* | (2022.01) |

(52) U.S. Cl.
CPC ............ *G06F 21/16* (2013.01); *G06F 21/33* (2013.01); *H04L 9/50* (2022.05)

(58) Field of Classification Search
CPC ............ G06F 21/16; G06F 21/33; H04L 9/50

USPC ......................................................... 726/26
See application file for complete search history.

(56) References Cited

U.S. PATENT DOCUMENTS

| | | | |
|---|---|---|---|
| 10,439,812 B2 | 10/2019 | Patin | |
| 10,642,967 B2 | 5/2020 | Balaraman et al. | |
| 10,650,376 B1 | 5/2020 | Winklevoss et al. | |
| 10,783,190 B2 | 9/2020 | Qiu | |
| 10,795,977 B2 * | 10/2020 | Salomon | G06F 8/41 |
| 10,936,552 B2 | 3/2021 | Androulaki et al. | |
| 10,984,124 B2 | 4/2021 | Thomson-Wood et al. | |
| 2019/0251551 A1 * | 8/2019 | Mousavi | G06K 19/00 |
| 2020/0050690 A1 * | 2/2020 | Gaur | H04L 9/50 |
| 2020/0084045 A1 * | 3/2020 | Cohen | H04L 9/14 |
| 2021/0064784 A1 | 3/2021 | Wei et al. | |

(Continued)

*Primary Examiner* — Michael S McNally
(74) *Attorney, Agent, or Firm* — Sherman IP LLP; Kenneth L. Sherman; Hemavathy Perumal

(57) ABSTRACT

One embodiment provides a method comprising verifying a digital asset to determine ownership, provenance, and lineage of the digital asset. The verifying includes blockchain forensic analysis and triangulation of one or more electronic devices involved in one or more blockchain transactions relating to the digital asset. The method further comprises computing a confidence score corresponding to the digital asset. The confidence score is a measurement derived from the verifying. The method further comprises maintaining a record of the digital asset in an electronic registry. The record includes the confidence score and is indicative of the ownership, the provenance, and the lineage of the digital asset. The method further comprises monitoring one or more changes to the ownership, the provenance, and the lineage of the digital asset, and updating the record including the confidence score in response to the one or more changes.

20 Claims, 7 Drawing Sheets

(56) References Cited

U.S. PATENT DOCUMENTS

2021/0109825 A1  4/2021  Liao
2021/0184859 A1* 6/2021  Wilbrecht ............. H04L 9/0618
2022/0327225 A1* 10/2022 Lyren ...................... H04S 1/007

* cited by examiner

VERIFYING, MONITORING, AND TOKENIZING DIGITAL ASSETS AS PROOF OF OWNERSHIP AND VALUATION OF THE DIGITAL ASSETS

CROSS REFERENCE TO RELATED APPLICATIONS

This application claims priority from U.S. Provisional Patent Application Ser. No. 63/189,624, filed on May 17, 2021, U.S. Provisional Patent Application Ser. No. 63/221,199, filed on Jul. 13, 2021, and U.S. Provisional Patent Application Ser. No. 63/256,109, filed on Oct. 15, 2021, all incorporated herein by reference.

TECHNICAL FIELD

One or more embodiments relate generally to digital assets, and in particular, a method and system for verifying, monitoring, and tokenizing digital assets as proof of ownership and valuation of the digital assets.

BACKGROUND

Digital assets include, but are not limited to, cryptocurrencies (e.g., Bitcoin, Ether), non-fungible tokens (NFTs), collectibles, or any other digital representation of tradable or transferable value. A digital asset has a corresponding pair of keys required to access the digital asset, wherein the corresponding pair includes a corresponding public key (which may be known to others) and a corresponding private key (which may not be known by anyone except a holder of the digital asset) that are required to access the digital asset. A digital asset is inaccessible if a holder of the digital asset loses a corresponding private key or the holder loses a password to a digital wallet holding the digital asset. A digital asset may be vulnerable to cyber attacks and data breaches such as, but not limited to, a breach or hack of a digital wallet holding the digital asset, theft of the digital asset, a ransomware attack, or a fraudulent act involving the digital asset (e.g., the digital asset is redirected to a fraudulent electronic wallet).

SUMMARY

One embodiment provides a method comprising verifying a digital asset to determine ownership, provenance, and lineage of the digital asset. The verifying includes blockchain forensic analysis and triangulation of one or more electronic devices involved in one or more blockchain transactions relating to the digital asset. The method further comprises computing a confidence score corresponding to the digital asset. The confidence score is a measurement derived from the verifying. The method further comprises maintaining a record of the digital asset in an electronic registry. The record includes the confidence score and is indicative of the ownership, the provenance, and the lineage of the digital asset. The method further comprises monitoring one or more changes to the ownership, the provenance, and the lineage of the digital asset, and updating the record including the confidence score in response to the one or more changes.

Another embodiment provides a system comprising at least one processor and a non-transitory processor-readable memory device storing instructions that when executed by the at least one processor causes the at least one processor to perform operations. The operations include verifying a digital asset to determine ownership, provenance, and lineage of the digital asset. The verifying includes blockchain forensic analysis and triangulation of one or more electronic devices involved in one or more blockchain transactions relating to the digital asset. The operations further include computing a confidence score corresponding to the digital asset. The confidence score is a measurement derived from the verifying. The operations further include maintaining a record of the digital asset in an electronic registry. The record includes the confidence score and is indicative of the ownership, the provenance, and the lineage of the digital asset. The operations further include monitoring one or more changes to the ownership, the provenance, and the lineage of the digital asset, and updating the record including the confidence score in response to the one or more changes.

Another embodiment provides a non-transitory processor-readable medium that includes a program that when executed by a processor performs a method comprising verifying a digital asset to determine ownership, provenance, and lineage of the digital asset. The verifying includes blockchain forensic analysis and triangulation of one or more electronic devices involved in one or more blockchain transactions relating to the digital asset. The method further comprises computing a confidence score corresponding to the digital asset. The confidence score is a measurement derived from the verifying. The method further comprises maintaining a record of the digital asset in an electronic registry. The record includes the confidence score and is indicative of the ownership, the provenance, and the lineage of the digital asset. The method further comprises monitoring one or more changes to the ownership, the provenance, and the lineage of the digital asset, and updating the record including the confidence score in response to the one or more changes.

These and other features, aspects and advantages of the present invention will become understood with reference to the following description, appended claims and accompanying figures.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
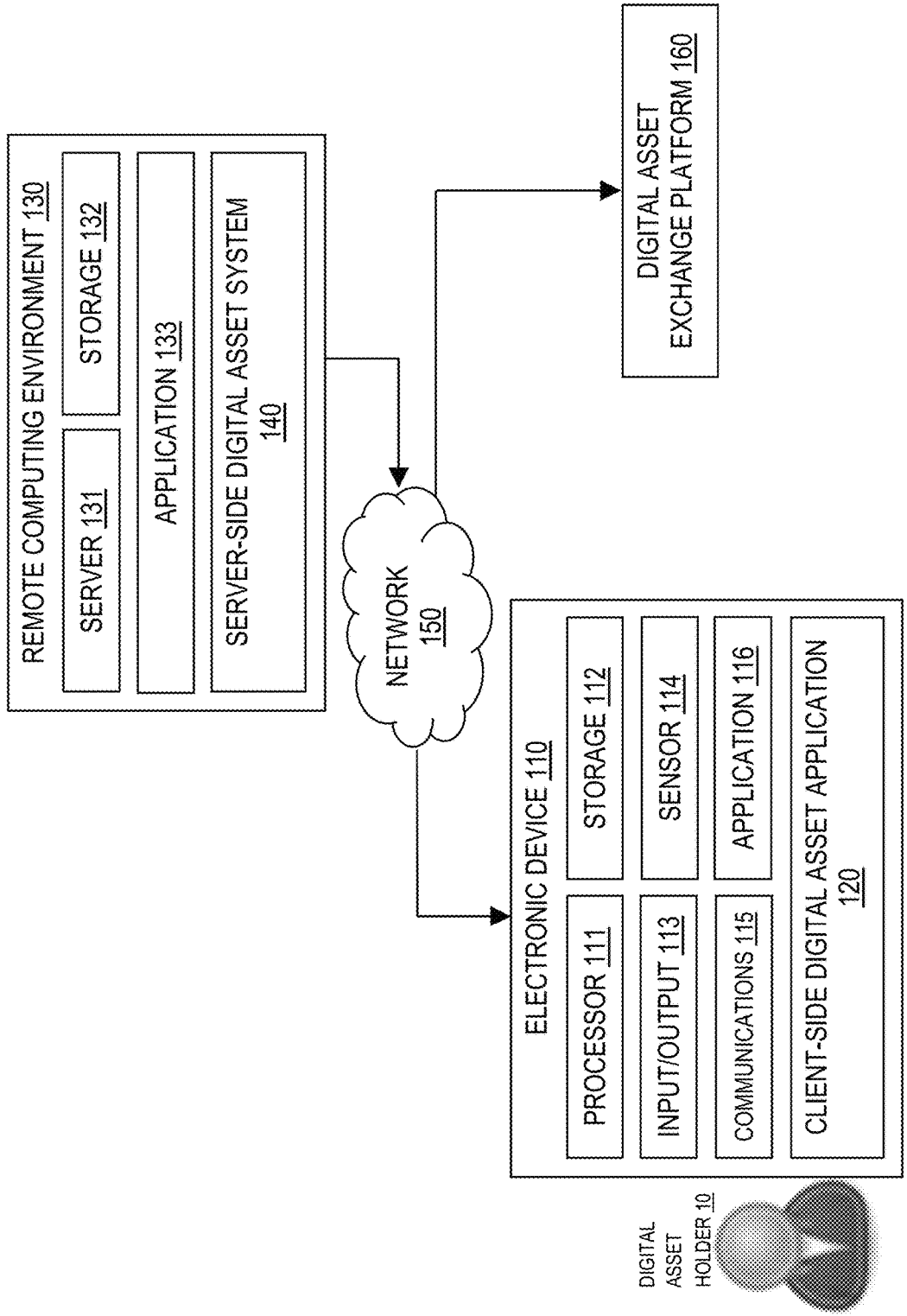
FIG. 1 is an example computing architecture for verifying, monitoring, and tokenizing digital assets, in one or more embodiments.

The detailed description explains the preferred embodiments of the invention together with advantages and features, by way of example with reference to the drawings.

DETAILED DESCRIPTION

One or more embodiments relate generally to digital assets, and in particular, a method and system for verifying, monitoring, and tokenizing digital assets as proof of ownership and valuation of the digital assets. One embodiment provides a method comprising verifying a digital asset to determine ownership, provenance, and lineage of the digital asset. The verifying includes blockchain forensic analysis and triangulation of one or more electronic devices involved in one or more blockchain transactions relating to the digital asset. The method further comprises computing a confidence score corresponding to the digital asset. The confidence score is a measurement derived from the verifying. The method further comprises maintaining a record of the digital asset in an electronic registry. The record includes the confidence score and is indicative of the ownership, the provenance, and the lineage of the digital asset. The method further comprises monitoring one or more changes to the ownership, the provenance, and the lineage of the digital asset, and updating the record including the confidence score in response to the one or more changes.

Another embodiment provides a system comprising at least one processor and a non-transitory processor-readable memory device storing instructions that when executed by the at least one processor causes the at least one processor to perform operations. The operations include verifying a digital asset to determine ownership, provenance, and lineage of the digital asset. The verifying includes blockchain forensic analysis and triangulation of one or more electronic devices involved in one or more blockchain transactions relating to the digital asset. The operations further include computing a confidence score corresponding to the digital asset. The confidence score is a measurement derived from the verifying. The operations further include maintaining a record of the digital asset in an electronic registry. The record includes the confidence score and is indicative of the ownership, the provenance, and the lineage of the digital asset. The operations further include monitoring one or more changes to the ownership, the provenance, and the lineage of the digital asset, and updating the record including the confidence score in response to the one or more changes.

Another embodiment provides a non-transitory processor-readable medium that includes a program that when executed by a processor performs a method comprising verifying a digital asset to determine ownership, provenance, and lineage of the digital asset. The verifying includes blockchain forensic analysis and triangulation of one or more electronic devices involved in one or more blockchain transactions relating to the digital asset. The method further comprises computing a confidence score corresponding to the digital asset. The confidence score is a measurement derived from the verifying. The method further comprises maintaining a record of the digital asset in an electronic registry. The record includes the confidence score and is indicative of the ownership, the provenance, and the lineage of the digital asset. The method further comprises monitoring one or more changes to the ownership, the provenance, and the lineage of the digital asset, and updating the record including the confidence score in response to the one or more changes.

For expository purposes, the term "smart contract" as used herein generally refers to a digital contract comprising a computer program or a transaction protocol that is stored on a blockchain that is automatically executed when predetermined terms and conditions are met.

For expository purposes, the term "digital asset exchange" as used herein generally refers to a direct-to-customer platform which typically operates without the need for intermediaries to place orders on behalf of their customers or hold customers' digital assets in custody. A digital asset exchange can function as a broker, a custodian, and a trading venue at the same time.

To date, there are more than 18.5 million minted Bitcoins, a fifth of which have not been traded for over 5 years. One possible reason for such inactivity is that a substantial portion of the Bitcoins that have not been traded are inaccessible (i.e., holders of these Bitcoins have lost private keys). Presently, recovery of a lost private key using existing methods, such as hacking or brute force recreation of the private key, is extremely low. However, technological advancements of the future, such as quantum computing or advancements in cryptography using advanced hash algorithms, may allow holders to retrieve lost private keys in the future.

One or more embodiments of the invention provide a method and system for verifying, monitoring, and tokenizing digital assets.

FIG. 1 is an example computing architecture 100 for verifying, monitoring, and tokenizing digital assets, in one or more embodiments. The computing architecture 100 comprises an electronic device 110 including resources, such as one or more processor units 111 and one or more storage units 112. One or more applications may execute/operate on the electronic device 110 utilizing the resources of the electronic device 110.

In one embodiment, the one or more applications on the electronic device 110 include a client-side digital asset application 120. In one embodiment, the application 120 is configured to provide a user interface for sending a request to verify, monitor, tokenize, and/or exchange a digital asset (e.g., cryptocurrencies such as coins, altcoins and tokens, non-fungible tokens (NFTs), collectibles, or any other digital representation of tradable or transferable value). Examples of cryptocurrencies include, but are not limited to, cryptocurrencies that rely on proof of work blockhains (e.g., Bitcoin and Ehtereum), cryptocurrencies that rely on proof of stake blockchains, tokens (e.g., Basic Attention Token), Stablecoins (e.g., Tether).

Examples of an electronic device 110 include, but is not limited to, a mobile electronic device (e.g., an optimal frame rate tablet, a smart phone, a laptop, etc.), a wearable device (e.g., a smart watch, a smart band, a head-mounted display, smart glasses, etc.), a desktop computer, a gaming console, an Internet of things (IoT) device, a television (TV) (e.g., a smart TV), etc.

In one embodiment, the electronic device 110 comprises one or more input/output (I/O) units 113 integrated in or coupled to the electronic device 110. In one embodiment, the one or more I/O units 113 include, but are not limited to, a physical user interface (PUI) and/or a graphical user interface (GUI), such as a remote control, a keyboard, a keypad, a touch interface, a touch screen, a knob, a button, a display screen, etc. In one embodiment, a user can utilize at least one I/O unit 113 to configure one or more parameters, provide user input, etc.

In one embodiment, the electronic device 110 comprises one or more sensor units 114 integrated in or coupled to the electronic device 110, such as, but not limited to, a camera, a microphone, a GPS, a motion sensor, etc.

In one embodiment, the electronic device 110 comprises a communications unit 115 configured to exchange data with a remote computing environment, such as the remote computing environment 130, and/or a digital asset exchange platform 160, over a communications network/connection 150 (e.g., a wireless connection such as a Wi-Fi connection or a cellular data connection, a wired connection, or a combination of the two). The communications unit 115 may comprise any suitable communications circuitry operative to connect to a communications network and to exchange communications operations and media between the electronic device 110 and other devices connected to the same communications network 150. The communications unit 115 may be operative to interface with a communications network using any suitable communications protocol such as, for example, Wi-Fi (e.g., an IEEE 802.11 protocol), Bluetooth high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the one or more applications on the electronic device 110 may further include one or more software mobile applications 116 loaded onto or downloaded to the electronic device 110, such as a digital wallet application, a camera application, a social media application, etc. A software mobile application 116 on the electronic device 110 may exchange data with the client-side digital asset application 120.

In one embodiment, the remote computing environment 130 includes resources, such as one or more servers 131 and one or more storage units 132. One or more applications 133 that provide higher-level services may execute/operate on the remote computing environment 130 utilizing the resources of the remote computing environment 130.

For expository purposes, the term "digital asset holder" as used in this specification generally refers to a user that owns or is in custody of a digital asset, wherein the user is either an individual or an entity. Examples of a digital asset holder 10 include, but is not limited to, an individual, a business, an investor (i.e., a retail investor, an institutional investor, or an accredited investor that purchased and owns the digital asset), a government entity that obtained the digital asset via asset seizure and forfeiture (e.g., law enforcement agencies, government agencies, etc.), a law firm, a digital wallet recovery firm, etc. In some application scenarios, a digital asset holder 10 represents a prospective seller of a digital asset (e.g., a seller on a digital asset exchange platform 160).

For expository purposes, the terms "distressed" or "distressed asset" as used herein generally refers to a digital asset that is inaccessible or under a third-party attack. A digital asset is inaccessible when a corresponding private key is lost (e.g., either accidentally or a digital asset holder 10 of the digital asset dies without transferring the private key) or a password to a digital wallet holding the digital asset is lost. A digital asset is under a third-party attack if a breach or hack of a digital wallet holding the digital asset occurs, a theft of the digital asset occurs (i.e., the digital asset is stolen), a ransomware attack involving the digital asset occurs, or a fraudulent act involving the digital asset occurs (e.g., the digital asset is redirected to a fraudulent electronic wallet).

In one embodiment, the one or more applications on the remote computing environment 130 include a server-side digital asset system 140. In one embodiment, the system 140 is configured to: (1) provide digital asset verification to determine (e.g., authenticate or verify) ownership of a digital asset, (2) maintain an electronic registry 270 (FIG. 2) comprising one or more entries (i.e., records) indicative of ownership, provenance, and lineage of one or more digital assets, (3) provide a subscription-based monitoring service to monitor one or more digital assets, (4) invoke one or more actions relating to investigation and recovery of a distressed asset, (5) automate creation of one or more smart contracts for one or more digital assets, and (6) perform digital asset tokenization to tokenize one or more digital assets.

As described in detail later herein, each record of ownership maintained in the registry 270 corresponds to a digital asset, and maps ownership of the digital asset to a digital asset holder 10 who is either in possession of or without possession of the digital asset. A digital asset holder 10 is in possession of a digital asset if the holder 10 has control of the digital asset (e.g., control of a digital wallet holding the digital asset). A digital asset holder 10 is still in possession of a digital asset even if the digital asset is inaccessible (e.g., a corresponding private key is lost, or a password to a digital wallet holding the digital asset is lost). A digital asset holder 10 is without possession of a digital asset if the holder 10 does not have control of the digital asset (e.g., the digital asset is under a third-party attack and is held in a digital wallet that the holder 10 does not control).

As described in detail later herein, the client-side digital asset application 120, the server-side digital asset system 140, and the digital asset exchange platform 160 are configured to interface and exchange data with each other.

In one embodiment, the digital asset exchange platform 160 facilitates sale of digital assets that the registry 270 maintains entries (i.e., records) for.

In one embodiment, the remote computing environment 130 provides an online platform for hosting one or more online services (e.g., the server-side digital asset system 140, etc.) and/or distributing one or more software mobile applications 116. For example, the client-side digital asset application 120 may be loaded onto or downloaded to the electronic device 110 from the remote computing environment 130 that maintains and distributes updates for the application 120.

In one embodiment, the remote computing environment 130 may comprise a cloud computing environment providing shared pools of configurable computing system resources and higher-level services (e.g., data analytics). In another embodiment, the remote computing environment 130 may comprise an edge computing environment providing more safe, scalable, and reliable data processing and computation for display color temperature adaptation modeling and/or display brightness adaptation modeling.

Figure 2:
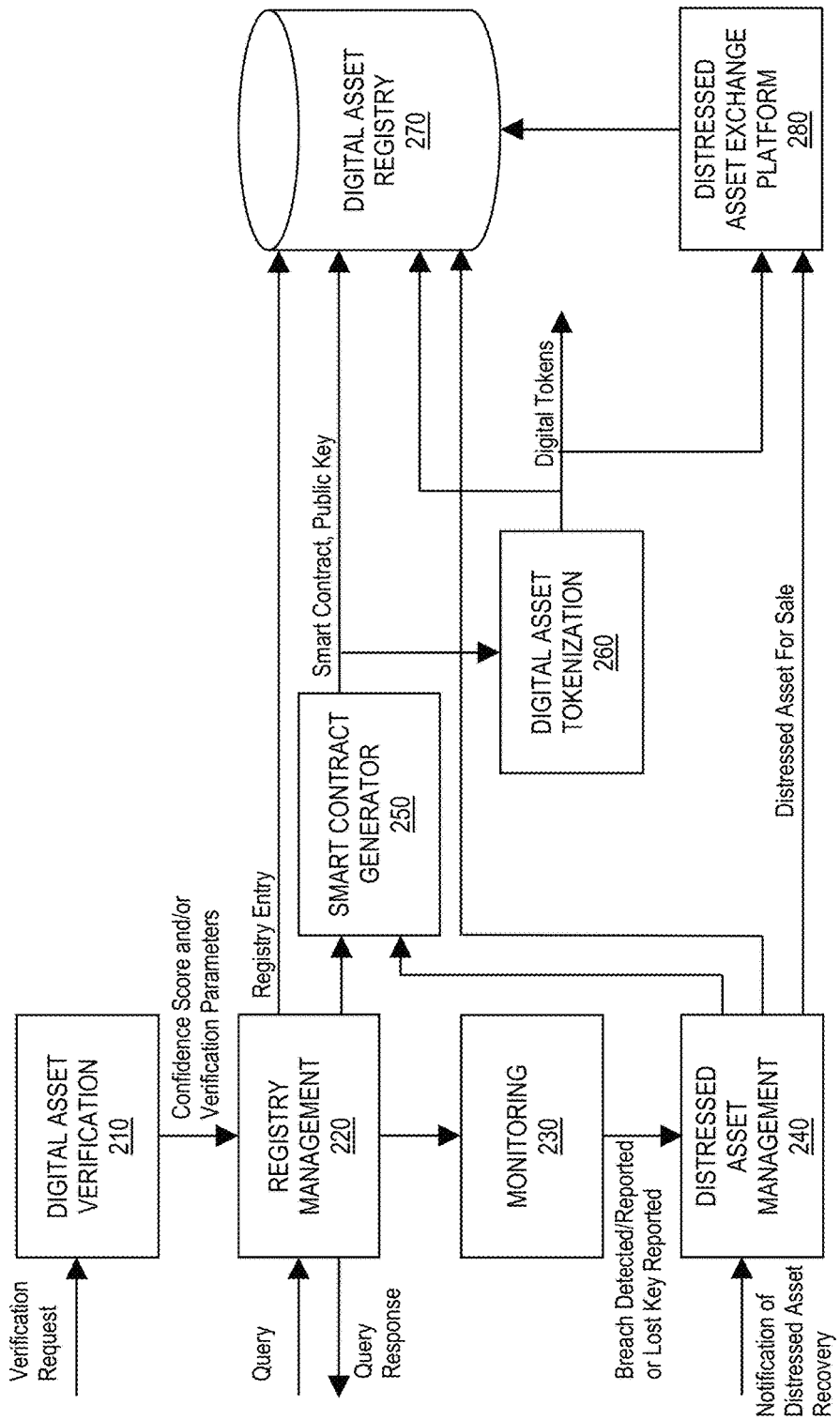
FIG. 2 illustrates an example server-side digital asset system, in one or more embodiments.

FIG. 2 illustrates an example server-side digital asset system 200, in one or more embodiments. In one embodiment, the server-side digital asset system 200 is deployed at a remote computing environment 130. For example, the server-side digital asset system 200 is integrated into, or implemented as part of, the server-side digital asset system 140 in FIG. 1.

In one embodiment, the system 200 comprises a digital asset verification unit 210 configured to: (1) receive a verification request to verify a digital asset, and (2) perform digital asset verification of the digital asset. In one embodiment, the verification request is received from a client-side digital asset application 120 on an electronic device 110. The digital asset may be stored in a digital wallet on the electronic device 110. The verification request may originate from a digital asset holder 10 interacting with the client-side digital asset application 120 via the electronic device 110.

In one embodiment, digital asset verification performed by the digital asset verification unit 210 is an enhanced due diligence process involving determining (e.g., authenticating or verifying) ownership of a digital asset and/or authenticating chain of custody (i.e., provenance and lineage) of the digital asset. The digital asset verification unit 210 performs digital asset verification utilizing one or more verification tools. Examples of verification tools include, but are not limited to, blockchain forensic analysis involving determining (e.g., authenticating or verifying) one or more blockchain transaction records relating to a digital asset, triangulation of one or more devices (e.g., the electronic device 110) involved in one or more blockchain transactions relating to the digital asset, risk assessment of a digital asset holder 10 of the digital asset (e.g., anti-money laundering (AML) risk assessment to analyze exposure of the holder 10 exposure to financial crime, Know Your Customer (KYC) risk assessment to analyze risks involved with maintaining a business relationship with the holder 10), determining one or more attributes relating to the digital asset's environmental, social, and governance (ESG) footprint (e.g., using ESG factors to evaluate the digital asset's sustainability (i.e., whether the digital asset is ESG compliant), such as how the digital asset was crypto mined), etc. In one embodiment, each verification tool utilized has a corresponding verification parameter representing one or more results of the verification tool. In one embodiment, each verification parameter has a corresponding weight.

In one embodiment, as part of digital asset verification, the digital asset verification unit 210 utilizes the one or more verification tools to implement KYC processes, i.e., establish identity of a digital asset holder 10, understand the nature of activities of the digital asset holder 10 and qualify that the source of funds for a digital asset held by the holder 10 is legitimate (e.g., the source of funds is not the result of money laundering, financial fraud, terrorism financing, and other financial crimes), and assess money laundering risks associated with the holder 10.

In one embodiment, as part of digital asset verification, the digital asset verification unit 210 utilizes the one or more verification tools to implement Know Your Asset (KYA) processes, i.e., determine (e.g., authenticate or verify) ownership of a digital asset and/or authenticate chain of custody (i.e., provenance and lineage) of the digital asset, etc.

In one embodiment, as part of digital asset verification, the digital asset verification unit 210 utilizes the one or more verification tools to determine an ESG footprint of a digital asset. The ESG footprint is indicative of sustainability of the digital asset based on ESG factors (e.g., how the digital asset was crypto mined, etc.).

In one embodiment, as part of digital asset verification, the digital asset verification unit 210 utilizes one or more machine learning models as part of the KYA processes implemented, KYC processes implemented, and/or determining an ESG footprint. For example, the machine learning models may be used to predict activity patterns of an owner or a custodian of a digital asset, predict high risk behavior of a digital asset holder 10, etc. In one embodiment, the machine learning models are trained and updated based on data collected by the digital asset verification unit 210.

In one embodiment, as part of digital asset verification, the digital asset verification unit 210 computes one or more confidence scores corresponding to a digital asset based on one or more results of one or more verification tools utilized. For example, a confidence score corresponding to a digital asset may be a KYA confidence score, where the KYA confidence score represents a measurement of degree of accuracy of digital asset verification of the digital asset based on the KYA processes implemented. As another example, a confidence score corresponding to a digital asset is a KYC confidence score, where the KYC confidence score represents a measurement of degree of accuracy of digital asset verification of the digital asset based on the KYC processes implemented (i.e., confidence in a digital asset holder 10 of the digital asset). KYA and KYC confidence scores corresponding to a digital asset are indicative of legitimacy and quality of ownership of the digital asset. As another example, a confidence score corresponding to a digital asset is an ESG confidence score, where the ESG confidence score represents a measurement of sustainability of the digital asset based on ESG factors. As described in detail later herein, a confidence score may be used in the valuation of a digital asset for sale. As another example, a confidence score corresponding to a digital asset is an ownership confidence score, where the ownership confidence score represents a measurement of degree of accuracy of ownership of the digital asset (e.g., likelihood a digital asset holder 10 is a legal owner of the digital asset). As another example, a confidence score corresponding to a digital asset is a provenance confidence score, where the provenance confidence score represents of degree of accuracy of provenance of the digital asset. As described in detail later herein, a confidence score may be used in the valuation of a digital asset for sale.

Each confidence score corresponding to a digital asset is computed based on at least one verification parameter corresponding to at least one verification tool utilized during digital asset verification of the digital asset. For example, in one embodiment, a confidence score corresponding to a digital asset is computed as a sum of at least one or more weighted verification parameter, wherein each weighted verification parameter is obtained by multiplying a verification parameter by a corresponding weight.

In one embodiment, the digital asset verification unit 210 is configured to compute a customizable (e.g., user-defined) confidence score based on at least one verification parameter. For example, a user may select verification tools, and define a customizable confidence score based on verification parameters corresponding to the verification tools selected.

In one embodiment, as part of digital asset verification, the digital asset verification unit 210 builds a risk profile corresponding to a digital asset, wherein the risk profile comprises one or more confidence scores corresponding to the digital asset and, optionally, one or more verification parameters each confidence score is based on. For example, in one embodiment, a risk profile may include a KYA confidence score, a KYC confidence score, an ESG confidence score, an ownership confidence score, a provenance confidence score, and/or a customizable confidence score.

In one embodiment, a risk profile corresponding to a digital asset further comprises a risk assessment of a digital asset holder 10. A risk assessment of a digital asset holder 10 is indicative of risks involved with maintaining a business relationship with the holder 10, and exposure of the holder 10 to financial crime (e.g., whether the holder 10 has a criminal history, etc.). For example, a risk assessment of a digital asset holder 10 may include a risk score/rating of the digital asset holder 10 that is objectively based on one or more factors, such as whether a government-issued identification for the holder 10 was provided, whether a date of birth of the holder 10 matches with a government-issued report, etc.

As described in detail later herein, in one embodiment, as part of digital asset verification, an affidavit of title of a digital asset is created upon authenticating or verifying a digital asset holder 10 as an owner of the digital asset based on the KYA processes and/or KYC processes implemented.

In one embodiment, as part of digital asset verification, for a non-distressed digital asset, the digital asset verification unit 210 establishes a digital asset holder's 10 ownership of the digital asset based on the holder's 10 possession of the digital asset, such as control/possession of a digital wallet holding the digital asset. For example, in one embodiment, the digital asset holder 10 is prompted to perform a test transaction and the digital asset verification unit 210 verifies the ownership by analyzing the blockchain. For a non-distressed digital asset, an example ownership confidence score corresponding to a digital asset is a binary value, i.e., 100 if a digital asset holder 10 has possession of the digital asset, 0 otherwise. Therefore, if an ownership confidence score corresponding to a digital asset is 100, a digital asset holder 10 is an owner of and in possession of the digital asset.

In one embodiment, as part of digital asset verification, for a distressed asset, the digital asset verification unit 210 establishes a digital asset holder's 10 ownership of the distressed asset based on a combination of factors, such as a KYA confidence score and/or a KYC confidence score, and corroborates the ownership with supporting evidence such as, but not limited to, a bank statement authenticating purchase of the asset, an affidavit of title of the asset, etc. For a distressed asset, an example ownership confidence score corresponding to a distressed asset is a non-binary value, e.g., in the range of 0 to 100 but excluding 100. The higher the ownership confidence score, the more likely a digital asset holder 10 is a legal owner of the digital asset.

In one embodiment, the system 200 comprises a digital asset registry 270 configured to maintain one or more entries (i.e., records) indicative of ownership, provenance, and lineage of one or more digital assets. The registry 270 maintains records of ownership of digital assets. Each entry of the registry 270 corresponds to a digital asset, and maintains data relating to ownership, provenance, and lineage of the digital asset. The registry 270 maps ownership of the one or more digital assets to one or more digital asset holders 10. In one embodiment, the registry 270 comprises one or more databases including the one or more entries, and the databases are implemented on at least one storage unit 132 of the remote computing environment 130.

In one embodiment, if a digital asset is owned by more than one digital asset holder 10, the registry 270 maps ownership of the digital asset to a digital asset holder 10 who is a primary owner of the digital asset, and, optionally, to one or more additional digital asset holders 10 who are secondary owners of the digital asset.

In one embodiment, the system 200 comprises a registry management unit 220 configured to update the registry 270. In one embodiment, the registry management unit 220 is configured to: (1) receive a risk profile corresponding to a digital asset (e.g., from the digital asset verification unit 210), and (2) update the registry 270 to include an entry corresponding to the digital asset based on the risk profile. For example, in one embodiment, in response to receiving a risk profile corresponding to a digital asset, the registry management unit 220 creates a new entry mapping ownership of a digital asset to a digital asset holder 10 identified in the risk profile, and updates the registry 270 to include the new entry. Other than ownership of the digital asset, the new entry includes data derived/extracted from the risk profile such as, but not limited to, each confidence score included in the risk profile, one or more verification parameters each confidence score is based on, provenance and lineage of the digital asset, risk assessment of the holder 10, etc.

In one embodiment, an entry of the registry 270 corresponding to a digital asset includes an affidavit of title of the digital asset. The affidavit is a legal document attesting a digital asset holder 10 (that the registry 270 maps the digital asset to) has ownership of the digital asset. In one embodiment, the registry management unit 220 receives the affidavit from the digital asset holder 10 or a third-party service. In another embodiment, the registry management unit 220 generates the affidavit upon the digital asset verification unit 210 authenticating or verifying the digital asset holder 10 as the owner of the digital asset. Therefore, an entry of the registry 270 corresponding to a digital asset may include data such as a KYA confidence score, a KYC confidence score, and/or an affidavit of title of the digital asset that support legitimacy and quality of ownership of the digital asset, and may be used as proof of ownership of the digital asset. An entry of the registry 270 corresponding to a digital asset represents a digital signature of enhanced due diligence. The digital signature of enhanced due diligence mitigates risk associated with the digital asset.

In one embodiment, the registry management unit 220 is configured to: (1) receive a query relating to ownership of a digital asset, (2) perform a lookup of the registry 270 to determine ownership of the digital asset, and (3) send a query response based on the lookup. The query may originate from a digital asset exchange platform 160 or an individual or entity operating a client-side digital asset application 120 on an electronic device 110. For example, if the query comprises a request to confirm that a purported digital asset holder 10 is an owner of the digital asset, the query response comprises a confirmation that the digital asset holder 10 is the owner of the digital asset if the registry 270 maps the digital asset to the digital asset holder 10.

Ownership, provenance, and lineage of a digital asset may change over time. In one embodiment, the system 200 provides a subscription-based monitoring service to monitor one or more digital assets that the registry 270 maintains one or more entries for. In one embodiment, the system 200 comprises a monitoring unit 230 configured to monitor a digital asset the registry 270 maintains an entry for. For example, the monitoring unit 230 is configured to monitor a digital wallet storing the digital asset. The monitoring unit 230 allows for the system 200 to perform enhanced due diligence periodically. In one embodiment, a digital asset is monitored by the monitoring unit 230 on a continuing, ongoing basis or a pre-determined periodic basis (e.g., weekly, monthly, quarterly, etc.). As described in detail later herein, data maintained in the registry 270 relating to ownership, provenance, and lineage of a digital asset is dynamically updated based on monitoring the digital asset (via the monitoring unit 230).

A digital asset becomes distressed when the digital asset becomes inaccessible (e.g., a corresponding private key is lost, or a password to a digital wallet holding the digital asset is lost) or the digital asset is under a third-party attack (e.g., a digital wallet storing the digital asset is breached or hacked, etc.). In one embodiment, the monitoring unit 230 is configured to detect when a digital asset that the registry 270 maintains a record of ownership of (i.e., proof of ownership of the digital asset by a digital asset holder 10) becomes distressed. For example, the monitoring unit 230 detects a digital asset as distressed if the monitoring unit 230 receives a notification from an owner of the digital asset, a custodian of the digital asset, or a third-party service reporting that a corresponding private key is lost (i.e., the digital asset is inaccessible) or the digital asset is under a third-party attack (e.g., a digital wallet holding the digital asset is breached or hacked). As another example, the monitoring unit 230 detects a digital asset as distressed if the monitoring unit 230 automatically detects itself that the digital asset is under a third-party attack.

In one embodiment, the monitoring unit 230 is configured to trigger an update of a risk profile corresponding to a digital asset. The monitoring unit 230 triggers an update of the risk profile on a pre-determined periodic basis (e.g., weekly, monthly, quarterly, etc.) or in response to detecting the digital asset is distressed. Specifically, the monitoring unit 230 triggers the update by invoking the digital asset verification unit 210 to: (1) perform digital asset verification of the digital asset to detect one or more changes in ownership, provenance, and lineage of the digital asset, and (2) update the risk profile corresponding to the digital asset in accordance with the changes detected. The monitoring unit 230 monitors for risk profile changes utilizing blockchain forensic analysis and other verification tools of the digital asset verification unit 210. If the digital asset is distressed, the risk profile changes provide evidence supporting that the digital asset is distressed.

The updated risk profile includes, but is not limited to, one or more updated confidence scores, one or more updated verification parameters each updated confidence score is based on, an updated risk assessment of a digital asset holder 10 of the digital asset, a new affidavit of title of the digital asset. If the digital asset is distressed, the updated risk profile flags or labels the digital asset as distressed and, optionally, may include information identifying a stage or state in the process of investigating and recovering a distressed asset that the digital asset is in.

In one embodiment, the monitoring unit 230 is configured to update the registry 270 in accordance with an updated risk profile corresponding to a digital asset. In one embodiment, if the updated risk profile indicates the digital asset is distressed, an entry corresponding to the digital asset in the registry 270 is updated to indicate the digital asset is distressed. Therefore, the registry 270 identifies a digital asset as distressed in response to an adverse event involving the digital asset (e.g., private key lost, theft, fraud, hacked, etc.). As the registry 270 maintains records of ownership of digital assets (i.e., distressed and non-distressed), the registry 270 may be used to trace back where a distressed asset that is stolen originates from. Each record of ownership maintained in the registry 270 corresponds to a digital asset, and maps ownership of the digital asset to a digital asset holder 10 who is either in possession of (e.g., the holder 10 has control of the digital asset even if the digital asset is inaccessible) or without possession of (e.g., the digital asset is under third-party attack) the digital asset.

In one embodiment, a notification from the monitoring unit 230 is sent to a digital asset holder 10. In one embodiment, a notification from the monitoring unit 230 is received via a client-side digital asset application 120 on an electronic device 110 (e.g., operated by the digital asset holder 10), text, email, or other means of electronic communication.

In one embodiment, a digital asset holder 10 may select a pre-determined periodic basis based on which a digital wallet storing a digital asset is monitored and/or a risk profile corresponding to the digital asset is updated. A digital asset holder 10 may be charged a fee based on the pre-determined periodic basis selected.

In one embodiment, the monitoring unit 230 utilizes one or more machine learning models as part of monitoring a digital asset. For example, the machine learning models may be used to predict activity patterns of an owner or a custodian of a digital asset, predict high risk behavior of a digital asset holder 10, predict third-party attacks, etc. In one embodiment, the machine learning models are trained and updated based on data collected by the monitoring unit 230.

In one embodiment, the system 200 comprises a distressed asset management unit 240 configured to invoke one or more actions relating to investigation and recovery of a distressed asset. In one embodiment, the monitoring unit 230 triggers the distressed asset management unit 240 to invoke the one or more actions in response to a digital asset becoming distressed (e.g., breach of a digital wallet storing the digital asset or loss of a corresponding private key). Specifically, the one or more actions include the distressed asset management unit 240 generating one or more documents supporting a claim of ownership of the distressed asset. The distressed asset management unit 240 generates the documents based on an entry of the registry 270 that maps ownership of the distressed asset to a digital asset holder 10 (e.g., if the digital wallet storing the digital asset was breached, the documents support the claim of ownership of the digital asset holder 10 that the registry 270 mapped ownership of the distressed asset to before the breach). The documents includes data authenticating or verifying the digital asset holder 10 as an owner of the distressed asset, such as one or more confidence scores, one or more verification parameters each confidence score is based on, a risk assessment of the holder 10, an affidavit of title of the digital asset, etc. The distressed asset management unit 240 transforms data maintained in the registry 270 to new data formatted/packaged in the documents for use in supporting a claim of ownership of the distressed asset. For example, when the distressed asset is recovered, the digital asset holder 10 may provide the documents to a government entity that recovered the distressed asset via asset seizure and forfeiture (e.g., law enforcement agencies, government agencies, etc.), a law firm, a digital/electronic wallet recovery firm, an insurance company (if the digital asset is covered by an insurance policy), etc.

The one or more actions further include the distressed asset management unit 240 providing the digital asset holder 10 with an option to sell their claim of ownership of the distressed asset. For example, the distressed asset management unit 240 may prompt the digital asset holder 10 (e.g., via a client-side digital asset application 120 on an electronic device 110) to indicate whether the holder 10 wants to sell the distressed asset. In lieu of waiting for the distressed asset to be recovered, the digital asset holder 10 may sell their claim of ownership to a buyer. If the digital asset holder 10 sells their claim of ownership, the distressed asset management unit 240 triggers an update of the registry 270 to map ownership of the distressed asset to the buyer, and the documents are updated to account for the sale. When the distressed asset is recovered, the buyer may provide the one or more updated documents to an entity that recovered the distressed asset (e.g., a government entity via asset seizure and forfeiture, such as law enforcement agencies, government agencies, etc.), a law firm, a digital/electronic wallet recovery firm, an insurance company, etc. The updated documents would reference to a record of ownership maintained in the registry 270 and authenticating or verifying the buyer as the new owner of the distressed asset. Examples of a buyer include, but is not limited to, an institutional investor, a retail investor, an accredited investor, etc.

The one or more actions further include the distressed asset management unit 240 receiving a notification of recovery of the distressed asset from a third party (e.g., a government entity, a law firm, a digital/electronic wallet recovery firm, an insurance company, etc.), and automatically submitting the documents supporting the claim of ownership to the third party to redeem the distressed asset.

In one embodiment, if a digital asset holder 10 wants to sell a distressed asset, the distressed asset management unit 240 facilitates the sale of the distressed asset on a distressed asset exchange platform 280 operated by the system 200. The platform 280 is a digital asset exchange platform specifically for trading distressed assets between digital asset holders 10 and buyers. In response to a sale of a distressed asset, a corresponding entry of the registry 270 is updated to reflect a change in ownership of the distressed asset. Presently, there are no existing digital asset exchange platforms that facilitate the buying and selling of distressed assets. The platform 280 allows distressed assets to be tradable or transferable.

In one embodiment, the system 200 is configured to interface and exchange data with other digital asset exchange platforms (e.g., operated by a third party or the same entity operating the system 200) that facilitate the trading of non-distressed digital assets (i.e., digital assets that are neither inaccessible nor under third-party attacks).

In one embodiment, valuation of a digital asset may be based on data included in a corresponding entry of the registry 270 such as, but not limited to, one or more confidence scores (e.g., a KYA confidence score, a KYC confidence score, an ESG confidence score, an ownership confidence score, a provenance confidence score), an affidavit of title of the digital asset, information identifying a stage or state in the process of investigation and recovery that the digital asset is in if distressed, etc. The valuation may be used by a buyer (e.g., on a digital asset exchange platform) to determine how much the buyer is willing to pay for the digital asset. The valuation may also be used by an insurance company to determine a suitable insurance policy for the digital asset.

For example, if a digital asset is distressed, a KYA confidence score, a KYC confidence score, an ownership confidence score and/or a provenance confidence score may be used in valuation of the digital asset for sale. As yet another example, if a digital asset is not distressed, a KYA confidence score, a KYC confidence score, an ownership confidence score and/or a provenance confidence score may be used in valuation of the digital asset for insurance purposes. As another example, if a digital asset is not distressed, an ESG confidence score may be used in valuation of the digital asset for sale. For instance, if the ESG confidence score is high, the digital asset may command a higher value on a digital asset exchange platform as the digital asset was crypto mined in an environmentally friendly or sustainable manner (e.g., crypto mined using hydropower or solar). Therefore, an entry of the registry 270 corresponding to a digital asset may include data that support a valuation of the digital asset, and may be used as proof of valuation of the digital asset.

In one embodiment, the system 200 comprises a smart contract generator 250 configured to generate a logical smart contract for a digital asset. In one embodiment, the smart contract represents a derivative, wherein the digital asset is the underlying asset that the smart contract derives its value from. The smart contract comprises an affidavit of title of the digital asset (e.g., from the registry management unit 220). One or more public keys corresponding to and identifying the digital asset are included in the smart contract. The smart contract further includes one or more terms directly written into the code of the smart contract. In one embodiment, the terms of the contract include, but are not limited to, at least one of the following: one or more confidence scores included in a risk profile corresponding to the digital asset, one or more verification parameters that each confidence score is based on, a risk assessment of a digital asset holder 10 of the digital asset, one or more terms related to liquidation, etc.

In one embodiment, an entry of the registry 270 corresponding to the digital asset includes the smart contract. In one embodiment, the registry management unit 220 triggers the smart contract generator 250 to generate the smart contact upon the digital asset verification unit 210 authenticating or verifying the digital asset holder 10 as the owner of the digital asset.

Examples of terms related to liquidation include, but are not limited to, a processing fee, a transaction fee, a commission fee, a compensation or restitution fee, a royalty fee, one or more third party recipients of a royalty fee or a compensation or restitution fee, etc. In one embodiment, fees such as a processing fee, a transaction fee, a commission fee, a royalty fee, and/or a compensation or restitution fee are agreed upon between a digital asset holder 10 and the system 200. In one embodiment, the system 200 collects an initial processing fee and/or an initial transaction fee. In one embodiment, the system 200 collects a commission fee, a subsequent processing fee, and/or a subsequent transaction fee for each future transaction involving the smart contract (e.g., a future trades of tokens resulting from asset tokenization of the smart contract). In one embodiment, liquidation could result, according to the terms of the smart contract, in fees paid to third parties.

The smart contract is the digital manifestation of elements constituting ownership of the underlying digital asset (e.g., elements such as corresponding public key(s), due diligence, blockchain forensics, affidavit of title, provenance and lineage, etc.) as well as any terms related to liquidation such as fees, recipients of fees, etc. The smart contract binds the digital asset to the digital asset holder 10 and includes, if necessary, specific terms related to liquidation.

In one embodiment, the system 200 further comprises an asset tokenization unit 260 configured to: (1) receive a smart contract (e.g., from the smart contract generator 250), wherein the smart contract includes one or more corresponding public keys identifying an underlying digital asset, and (2) perform digital asset tokenization to create one or more digital tokens on a blockchain, wherein the digital tokens represent the smart contract. The digital tokens provide access to the smart contract. In one embodiment, an entry of the registry 270 corresponding to the underlying digital asset further maps ownership of the digital tokens to a digital asset holder 10 of the underlying digital asset. The digital tokens provide the digital asset holder 10 with proof of ownership of the underlying digital asset, regardless of whether the digital asset holder 10 is in possession of or without possession of the digital asset. Therefore, in the absence of the digital asset holder's 10 possession of the underlying digital asset (i.e., the digital asset is under third-party attack), the digital tokens are indicative of legitimacy and quality of ownership of the digital asset, and provide evidence of the holder's 10 ownership of the digital asset. Further, the same entry of the registry 270 maintains one or more attributes of the digital tokens. These attributes include, but are not limited to, one or more confidence scores (e.g., a KYA confidence score, a KYC confidence score, an ownership confidence score, a provenance confidence score, and/or an ESG confidence score) corresponding to the underlying digital asset, an affidavit of title of the underlying digital asset, information identifying a stage or state in the process of investigation and recovery that the underlying digital asset is in if distressed, etc. The registry 270 binds these attributes to the digital tokens. These attributes may be used in valuation of the digital tokens.

Examples of digital tokens include, but are not limited to, coins, NFTs, security coins, or any other digital representation of tradable or transferable value.

Digital asset tokenization is the process of turning a smart contract into a liquid asset (i.e., one or more digital tokens) that is tradable or transferable (e.g., tradable on a digital asset exchange platform 160 operated by a third party or the same entity operating the system 200). With digital asset tokenization, some form of digital assets are converted into one or more digital tokens that can be moved, stored, or recorded on a blockchain. For example, in one embodiment, the system 200 deposits one or more digital tokens (e.g., from the digital asset tokenization unit 260) into a digital wallet of a digital asset holder 10, and the digital asset holder 10 can trade the digital tokens on a digital asset exchange platform 160. A buyer of the digital tokens (e.g., purchased via the digital asset exchange platform 160) will have access to a smart contract for a digital asset, including an affidavit of title of the digital asset and other information included in the smart contract (e.g., the terms written into the code of the smart contract), the pair of keys corresponding to the smart contract, and the public key corresponding to and identifying the digital asset.

In one embodiment, if a digital asset holder 10 wants to sell a distressed asset, the system 200 is configured to create one or more corresponding digital tokens for exchange on the distressed asset exchange platform 280. For example, in one embodiment, the system 200 creates the corresponding digital tokens by: (1) generating (e.g., via the smart contract generator 250) a smart contract, wherein the distressed asset is the underlying digital asset that the smart contract derives its value from, and (2) creating (e.g., via the asset tokenization unit 260) the corresponding digital tokens based on the smart contract. Attributes (e.g., confidence scores) bound to the corresponding digital tokens (i.e., maintained in an entry of the registry 270 corresponding to the underlying digital asset) may be used in valuation of the digital tokens.

In one embodiment, digital asset tokenization involves generating a pair of keys (private key and public key) corresponding to a smart contract, wherein the corresponding public key identifies the smart contract and the corresponding private key provides access to the smart contract. The system 200 then encrypts (e.g., via the digital asset tokenization unit 260) the smart contract into one or more digital tokens, such as cryptocurrency coins or NFTs, depending on application scenario/use case. For example, if the smart contract includes only a few terms or does not include any terms related to liquidation, the digital tokens may be cryptocurrency coins. As another example, if the smart contract includes terms that need to be executed upon liquidation, the digital tokens may be NFTs instead.

In one embodiment, as part of digital asset tokenization, the asset tokenization unit 260 is configured to bind a public key identifying an underlying digital asset and/or a public key identifying a smart contract for the underlying digital asset with data referencing digital tokens created from the smart contract. With such binding, the digital tokens provide additional proof of ownership of the underlying digital asset. A digital asset holder 10 may utilize the digital tokens to demonstrate ownership of the underlying digital asset even when the digital asset holder 10 is without possession of the digital asset (i.e., the digital asset is under third-party attack).

In one embodiment, the registry 270 maps ownership of one or more smart contracts, one or more digital assets underlying the smart contracts, and one or more digital tokens created from the smart contracts to one or more digital asset holders 10. Ownership of a digital asset, a smart contract for a digital asset, and/or a digital token created from a smart contract are recorded in the registry 270. The registry 270 maintains data that provides proof of ownership of, title of, and provenance of a digital asset underlying a smart contract that the system 200 created tokens from. In one embodiment, a digital asset exchange platform 160 or a prospective buyer or potential custodian of tokens can query the system 200 (e.g., the registry management unit 220) to authenticate or verify ownership of, title of, and provenance and lineage of a digital asset, a smart contract that the digital asset is underlying, or tokens created from the smart contact. The registry 270 brings trust to digital assets by ensuring risks are minimized, while providing security for digital asset holders 10 who have fallen victim to a hack, theft, or fraud.

In one embodiment, automatic creation of a smart contract and digital asset tokenization is optional. In one embodiment, a digital asset holder 10 may sell their claim of ownership of a distressed asset with or without a smart contract (and digital tokens representing the smart contract).

In one embodiment, a smart contract facilitates valuation of one or more digital tokens (e.g., from the digital asset tokenization unit 260). For example, a prospective buyer (e.g., on a digital asset exchange platform 160) determines a value of the digital tokens based on a set of valuation parameters. The set of valuation parameters include one or more valuation parameters derived from the smart contract such as, but not limited to, one or more confidence scores and/or one or more verification parameters each confidence score is based on. Therefore, digital asset verification (e.g., via the digital asset verification unit 210) provides an "added value" to an underlying digital asset of the smart contract. Specifically, the "added value" in the form of an affidavit of title, one or more confidence scores, and/or one or more verification parameters represent a digital signature of enhanced due diligence performed (e.g., blockchain forensic analysis, determining whether the digital asset is ESG compliant) to verify ownership and/or authenticate chain of custody (i.e., provenance and lineage) of the underlying digital asset. The digital signature of enhanced due diligence mitigates risk. In the event the underlying digital asset becomes a distressed asset, the digital tokens transform the distressed asset into a tradable or transferable asset (its value based in part on the digital signature of enhanced due diligence), thereby improving cryptocurrency and blockchain technologies.

Digital asset verification transforms a digital asset into a premium crypto asset with "added value" through a smart contract enabled "title" to the asset (i.e., the smart contract comprises an affidavit of title of the digital asset). The added value also comes from the due diligence and KYA, KYC, and ESG aspects of the digital asset (i.e., the smart contract includes terms directly written into the code of the smart contract such as one or more confidence scores, one or more verification parameters, a risk assessment, etc.) which can give a prospective buyer (e.g., a potential investor) or a potential custodian (e.g., a bank) added confidence in the mitigated risk associated with the asset. For example, digital asset verification provides the prospective buyer or the potential custodian confidence that the underlying asset and the digital asset holder are not associated with criminal activities (e.g., based on a KYA confidence score, a KYC confidence score, an ownership confidence score and/or a provenance confidence score). As another example, digital asset verification provides the prospective buyer or the potential custodian confidence that the underlying asset is ESG compliant (e.g., based on ESG confidence score).

The set of valuation parameters may further include one or more other valuation parameters such as, but not limited to, at least one of the following: a dynamic daily valuation of the digital asset, a future value of the digital asset, a future appreciation of the digital asset, a probability/likelihood of the digital asset being realized (i.e., becoming accessible), geolocation, an actual present valuation of the digital asset, etc. In one embodiment, the probability/likelihood of the digital asset being realized is based on how probable technological advancements for retrieving lost private keys are (e.g., advances or progress of quantum computing). In one embodiment, appreciation of the digital asset underlying the smart contract will correlate to appreciation of the one or more digital tokens.

In one embodiment, during valuation of one or more digital tokens, a prospective buyer may factor into account an independent valuation of the digital tokens from a token evaluator. Examples of a token evaluator include, but is not limited to, a representative of the entity operating the system 200, a representative of the digital asset exchange platform 160, etc.

Examples of users of the system 200 include, but are not limited to, direct customers (e.g., individuals such as retail investors or entities such as institutional investors), custody providers (third parties that custody digital assets, e.g., banks), non-custody providers (third parties providing services, other than custody, relating to digital assets), family offices, law firms, accredited investors, insurance companies, etc. For custody and non-custody providers, the system 200 mitigates reputational damage and provides a cost effective layer of additional security (e.g., digital asset verification, the registry 270, subscription-based monitoring service). For direct customers and family offices, the system 200 provides cost effective security (e.g., digital asset verification, the registry 270, subscription-based monitoring service), minimizes costs (e.g., legal, investigative) associated with investigation and recovery of a digital asset (e.g., distressed asset management), and flexibility to custody their digital assets where they desire. For insurance companies, the system 200 provides data (e.g., risk profile, entries of the registry 270) to underwrite an insurance policy covering a digital asset. For law firms, the system 200 provides data (e.g., risk profile, entries of the registry 270) for use in dispute resolution, estate planning, and as evidence for liquidations, insolvency, and class actions. For accredited investors, the system 200 facilitates speculation on distressed assets (e.g., digital asset verification, risk profile, entries of the registry 270) and leveraging of distressed assets for launching initial coin offerings (ICOs) and other investment products (e.g., automatic creation of smart contracts and digital asset tokenization).

Figure 3:
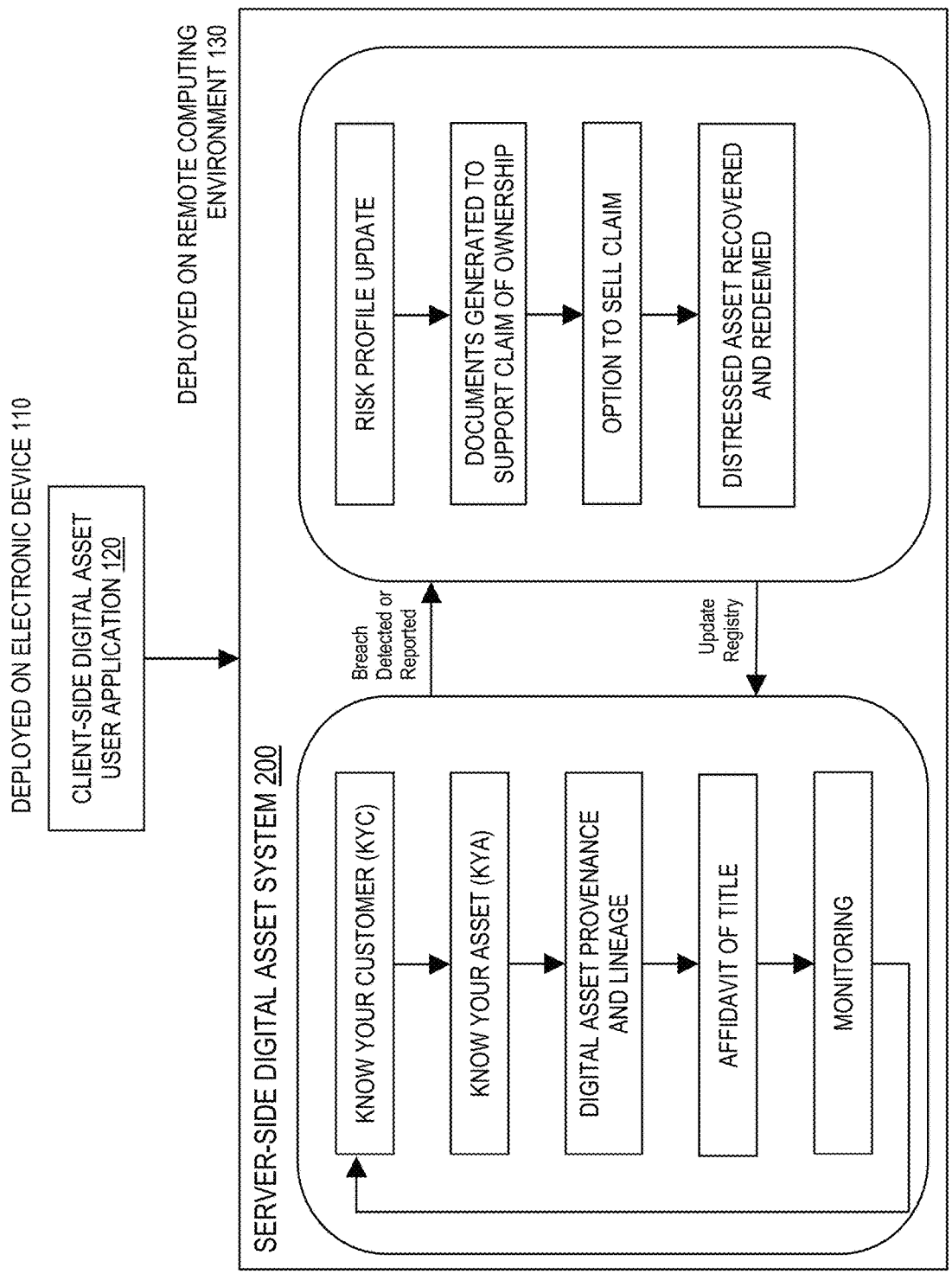
FIG. 3 illustrates an example workflow of the system, in one or more embodiments.

FIG. 3 illustrates an example workflow of the system 200, in one or more embodiments. In one embodiment, a user such as a direct customer, a custody provider, or a non-custody provider may access the system 200 via a client-side digital asset user application 120 on an electronic device 110. In one embodiment, a user such as a custody provider or a non-custody provider may access the system 200 via API onboarding features.

The system 200 maintains an entry corresponding to a digital asset in the registry 270. The entry is generated and updated by: (1) performing KYC processes (via the digital asset verification unit 210), (2) performing KYA processes (via the digital asset verification unit 210), (3) determining provenance and lineage of the digital asset (via the digital asset verification unit 210), (4) receiving or generating an affidavit of title of the digital asset, and (5) monitoring the digital asset on a continuing, ongoing basis or on a predetermined periodic basis (via the monitoring unit 230). If a breach of a digital wallet storing the digital asset is detected/reported, the digital asset becomes a distressed asset and the system 200 invokes one or more actions relating to investigation and recovery of the distressed asset (via distressed asset management unit 240). The actions include: (1) updating a risk profile corresponding to the distressed asset, (2) generating documents to support claim of ownership of a digital asset holder 10 that the registry 270 mapped ownership of the distressed asset to before the breach, (3) provide the digital asset holder 10 an option to sell the claim of ownership, and (4) redeem the distressed asset utilizing the documents when the distressed asset is recovered. Upon successful redemption of the distressed asset, the registry 270 is updated to account for the redemption.

The system 200 may be used in different application scenarios. One example application scenario involves liquidation of an inaccessible digital asset. Specifically, in this example application scenario, the digital asset is inaccessible (i.e., a corresponding private key is lost, or a password to a digital wallet holding the digital asset is lost), and a smart contract for the digital asset and/or one or more digital tokens created from the smart contract provide proof of legal ownership of, title of, and provenance and lineage of the digital asset in the absence of a corresponding private key required to access the digital asset. For example, a private citizen (e.g., an individual investor) or a private entity (e.g., a digital/electronic wallet recovery firm) lost access to the corresponding private key, or a public entity (e.g., a government entity holding the digital asset obtained via asset seizure and forfeiture) has no access to the corresponding private key. The digital tokens transform the distressed asset into a tradable or transferable asset, thereby improving cryptocurrency and blockchain technologies. The system 200 provides digital asset holders 10 of inaccessible digital assets an opportunity to liquidate these assets.

Another example application scenario involves providing additional security for an accessible digital asset. Specifically, in this example application scenario, the digital asset is accessible (i.e., a corresponding private key is not lost), and a smart contract for the digital asset and/or one or more digital tokens created from the smart contract are used as collateral to mitigate risk on future loss of a corresponding private key required to access the digital asset. For example, an original investor of the digital asset may use the smart contract and/or the one or more digital tokens as leverage to underwrite an insurance policy protecting against a future loss of a corresponding private key required to access the digital asset. In yet another example application scenario, the digital asset is obtained via asset seizure and forfeiture by a government entity, and the smart contract and/or the one or more digital tokens authenticate chain of custody (i.e., provenance and lineage) of the digital asset. The smart contract and the digital tokens represent a digital signature of enhanced due diligence, thereby mitigating risk and improving cryptocurrency and blockchain technologies.

Other example application scenarios include storing of value for long term strategic investors, providing a premium crypto asset added value through a smart contract enabled "title" to asset, providing a registry of legal ownership, providing a legal recourse against fraud. For example, a public entity such as a government entity holding an inaccessible digital asset obtained via asset seizure and forfeiture may utilize a smart contract and resulting tokens to provide compensation or restitution fees to victims when the digital tokens are sold in future trades. As another example, a public entity such as a law enforcement agency negotiating a plea bargain may utilize a smart contract to include terms of a plea bargain, such as release of an electronic wallet containing tokens created from the smart contract, etc. As another example, a private citizen may utilize a smart contract for purposes of escheatment, estate planning, etc. As another example, a smart contract providing proof of legal ownership of, title of, and provenance and lineage of a digital asset underlying the smart contract can be used as defense or protection against ransomware attacks, fraudulent acts (e.g., funds redirected to a fraudulent electronic wallet), transfer error (e.g., funds erroneously transferred to an incorrect electronic wallet), or hacked wallets (e.g., bad actors gain access to an electronic wallet and siphon funds to another electronic wallet), i.e., the smart contract allows the digital asset to be traced and redeemed.

The system 200 allows holders of digital assets to recover value if these assets are distressed (e.g., inaccessible), diversify, and hedge against loss of private keys. The system 200 also allows prospective buyers to buy distressed (e.g., inaccessible) digital assets at a discount, and speculate on appreciation of the assets or the ability to retrieve the assets (e.g., via future advancements in quantum computing).

In one embodiment, the system 200 may be utilized in conjunction with white label services (e.g., digital asset exchanges, payment services, cross border and correspondent banking services, etc.), licensing/partnership programs (e.g., government partnership, trusted wallets and credible coins, financial crime compliance including anti-money laundering and Know Your Customers (AML & KYC) compliance, law enforcement, revenue and taxation, anti-corruption, etc.), charitable programs (e.g., educational credits, funding, grants and scholarships, development programs), etc.

Figure 4:
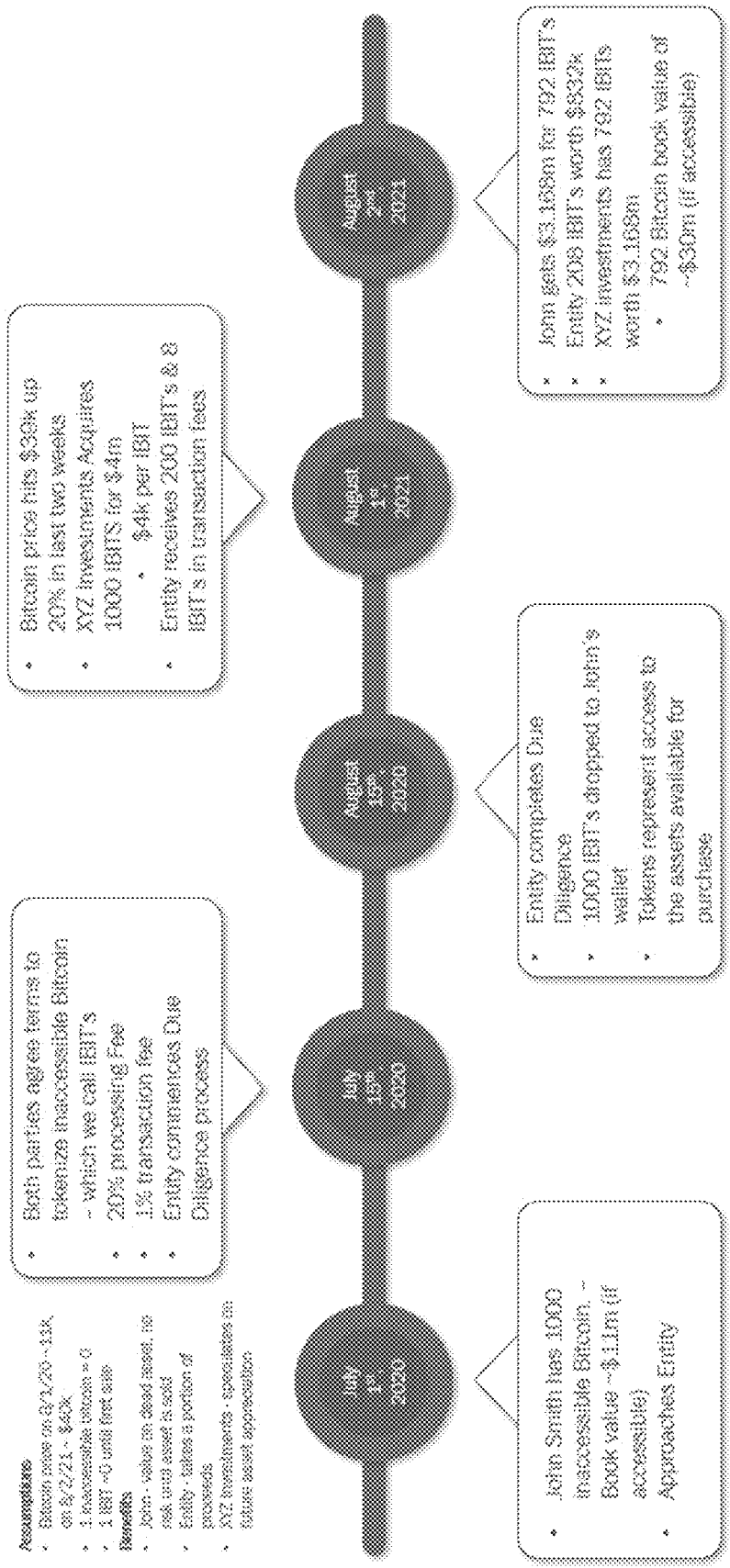
FIG. 4 illustrates an example application scenario in which the system is utilized, in one or more embodiments.

FIG. 4 illustrates an example application scenario in which the system 200 is utilized, in one or more embodiments. This example application scenario involves John, a digital asset holder 10, requesting Entity, an entity operating the system 200, to verify and tokenize an inaccessible digital asset (i.e., a corresponding private key is lost, or a password to a digital wallet holding the digital asset is lost). Digital tokens resulting from digital asset tokenization of the digital asset are deposited into an electronic wallet of John. XYZ Investments, a buyer, purchases the digital tokens when John trades the digital tokens on a digital asset exchange platform 160. Entity receives processing and/or transaction fees from the digital asset tokenization as well as from the sale of the digital tokens to XYZ Investments.

Figure 5:
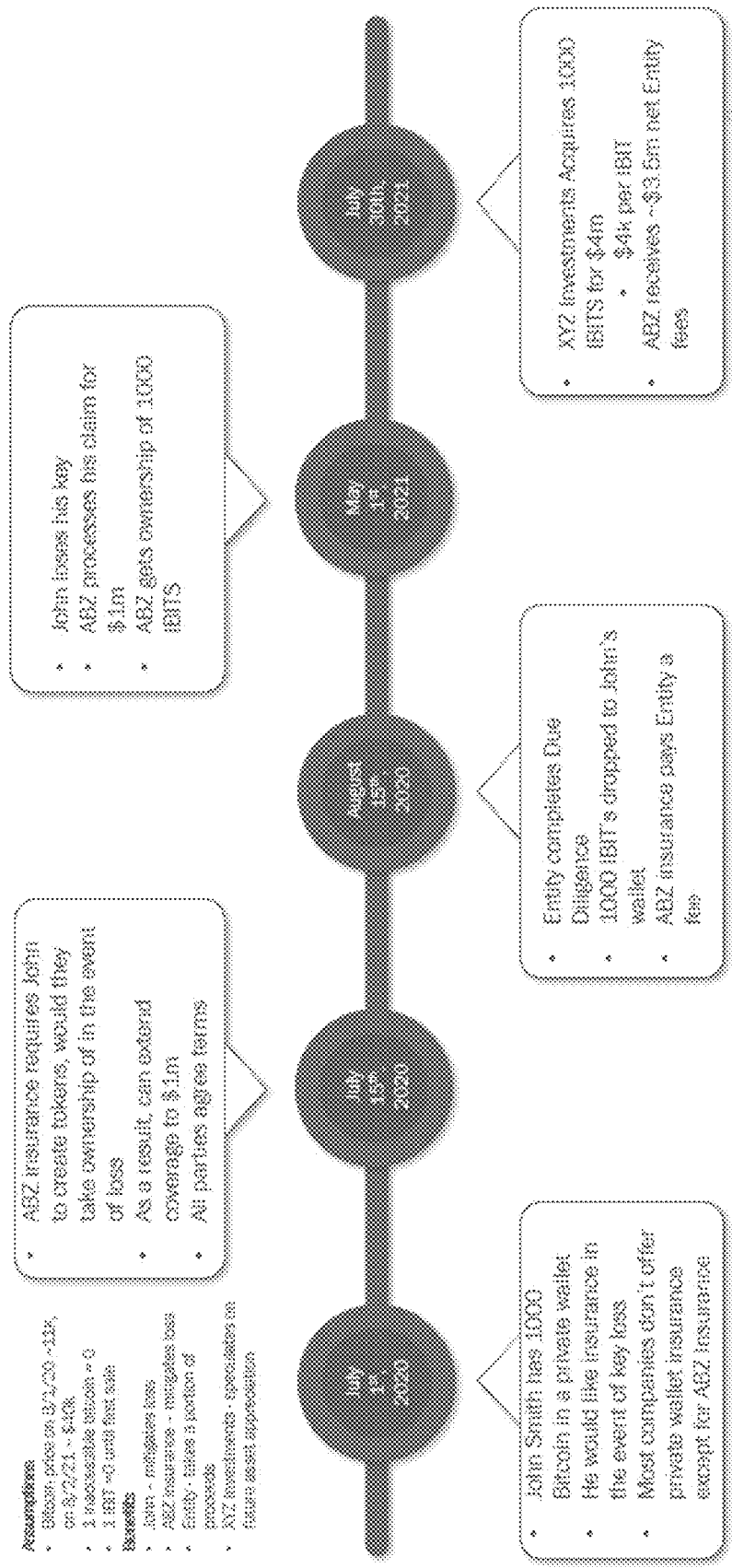
FIG. 5 illustrates another example application scenario in which the system is utilized, in one or more embodiments.

FIG. 5 illustrates another example application scenario in which the system 200 is utilized, in one or more embodiments. This example application scenario involves ABC Insurance, a digital asset holder 10, requesting Entity, an entity operating the system 200, to verify and tokenize an accessible digital asset (i.e., a corresponding private key is not lost) owned by John for purposes of underwriting an insurance policy protecting against future loss of a corresponding private key. ABC Insurance will only protect an electronic wallet of John if the digital asset is tokenized. Digital tokens resulting from asset tokenization of the digital asset are deposited into the electronic wallet of John and used as collateral for the insurance policy. If John loses the corresponding private key, ABC Insurance gets ownership of the digital tokens. XYZ Investments, a buyer, purchases the digital tokens when ABC Insurance trades the digital tokens on a digital asset exchange platform 160. Entity receives processing and/or transaction fees from the digital asset tokenization as well as from the sale of the digital tokens to XYZ Investments.

Figure 6:
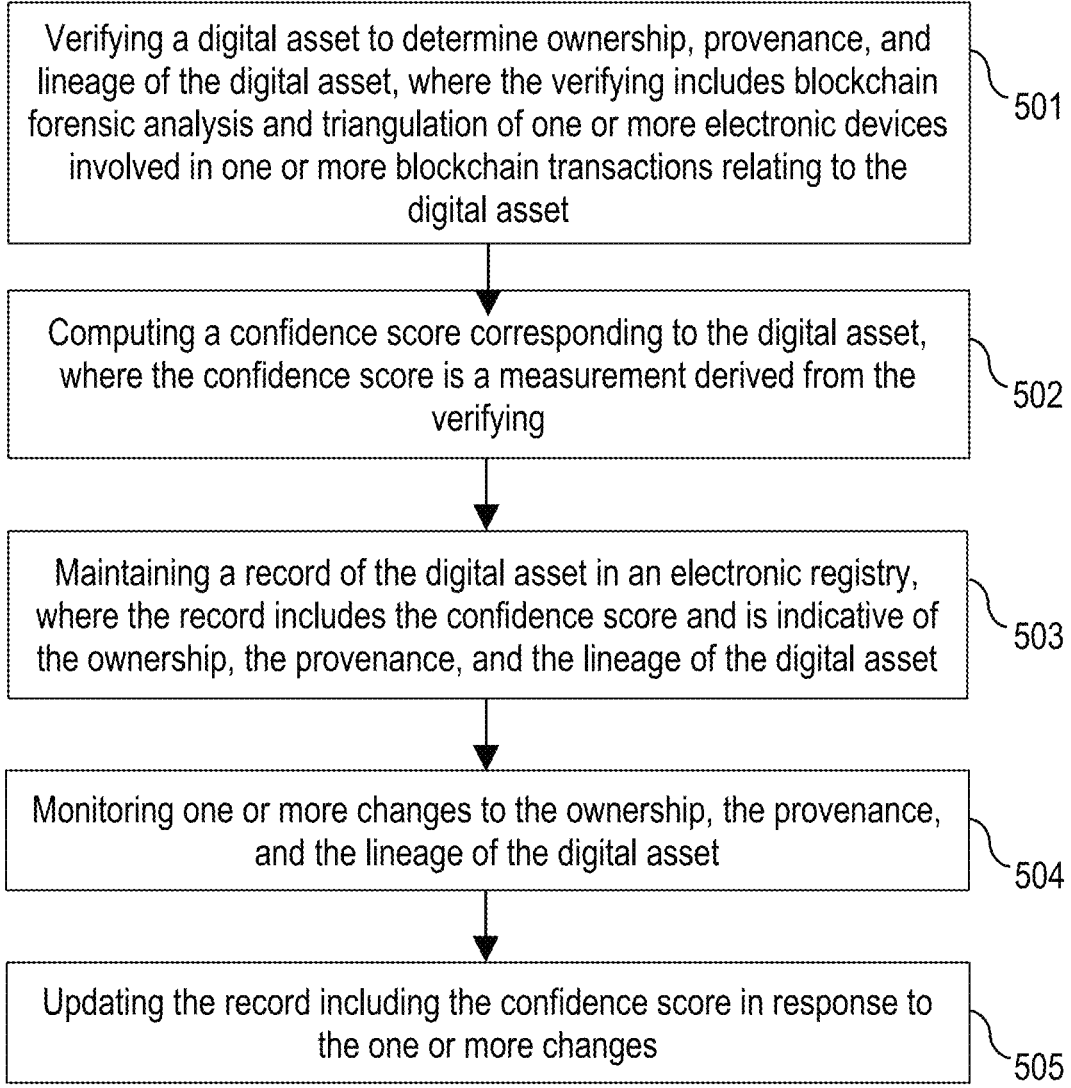
FIG. 6 is a flowchart of an example process for verifying and monitoring digital assets, in one or more embodiments.

FIG. 6 is a flowchart of an example process 500 for verifying and monitoring digital assets, in one or more embodiments. Process block 501 includes verifying a digital asset to determine ownership, provenance, and lineage of the digital asset, wherein the verifying includes blockchain forensic analysis and triangulation of one or more electronic devices involved in one or more blockchain transactions relating to the digital asset. Process block 502 included computing a confidence score corresponding to the digital asset, where the confidence score is a measurement derived from the verifying. Process block 503 includes maintaining a record of the digital asset in an electronic registry, wherein the record includes the confidence score and is indicative of the ownership, the provenance, and the lineage of the digital asset. Process block 504 includes monitoring one or more changes to the ownership, the provenance, and the lineage of the digital asset. Process block 505 includes updating the record including the confidence score in response to the one or more changes.

In one embodiment, process blocks 501-505 may be performed utilizing one or more components of the system 200, such as the digital asset verification unit 210, the registry management unit 220, and the monitoring unit 230.

Figure 7:
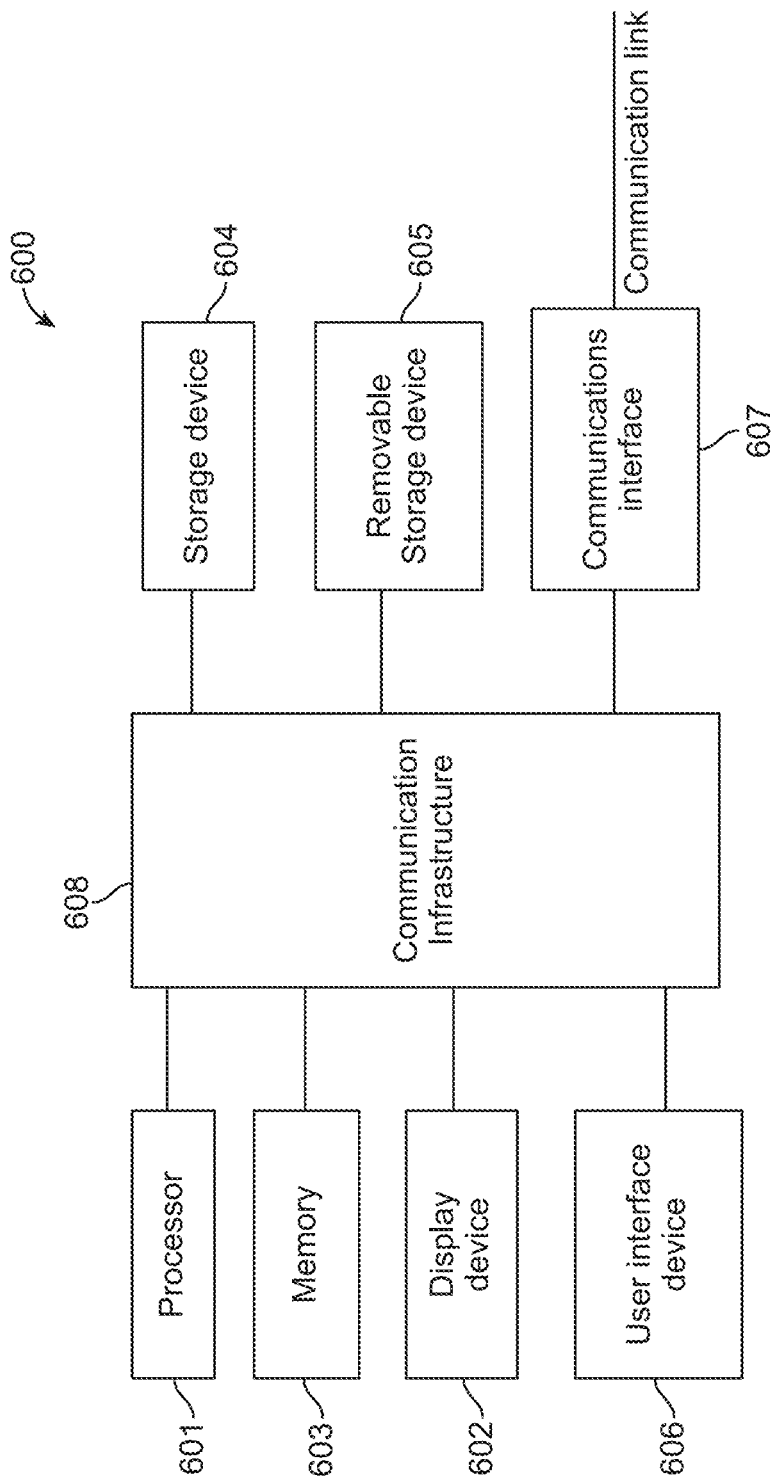
FIG. 7 is a high-level block diagram showing an information processing system comprising a computer system useful for implementing the disclosed embodiments.

FIG. 7 is a high-level block diagram showing an information processing system comprising a computer system 600 useful for implementing the disclosed embodiments. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), user interface device 606 (e.g., keyboard, touch screen, keypad, pointing device), and a communication interface 607 (e.g., modem, a network interface (such as an Ethernet card), a communications port, or a PCMCIA slot and card). The main memory 603 may store instructions that when executed by the one or more processors 601 cause the one or more processors 601 to perform one or more process blocks of the process 500.

The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process. In one embodiment, processing instructions for one or more process blocks of process 500 (FIG. 6) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   verifying a digital asset to determine ownership, provenance, and lineage of the digital asset, wherein the verifying includes blockchain forensic analysis and triangulation of one or more electronic devices involved in one or more blockchain transactions relating to the digital asset;
   computing a confidence score corresponding to the digital asset, wherein the confidence score is a measurement derived from the verifying;
   maintaining a record of the digital asset in an electronic registry, wherein the record includes the confidence score and is indicative of the ownership, the provenance, and the lineage of the digital asset;
   monitoring one or more changes to the ownership, the provenance, and the lineage of the digital asset;
   updating the record including the confidence score in response to the one or more changes; and
   generating one or more digital tokens on a blockchain, wherein the one or more digital tokens are deposited into a digital wallet, the one or more digital tokens are tradeable on a digital asset exchange, valuation of the one or more digital tokens is based on the confidence score, and the one or more digital tokens contain information providing proof of the ownership, the provenance, and the lineage of the digital asset for valuation of the digital asset.

2. The method of claim 1, wherein the confidence score is computed based on one or more verification parameters.

3. The method of claim 2, wherein the record further includes the one or more verification parameters, and an affidavit of title of the digital asset.

4. The method of claim 3, further comprising:
   generating a smart contract for the digital asset, wherein the smart contract includes the confidence score, the one or more verification parameters, and the affidavit of title.

5. The method of claim 4, further comprising:
   updating the one or more digital tokens on the blockchain in response to the one or more changes;
   wherein the digital tokens are generated based on the smart contract, and the valuation of the digital asset is different from the valuation of the digital tokens.

6. The method of claim 1, wherein the digital asset is monitored on a continuing basis or a periodic basis, the monitoring comprises utilizing one or more machine learning models to predict one or more activities relating to the digital asset, and the monitoring further comprises updating the one or more machine learning models based on data collected during the monitoring.

7. The method of claim 1, wherein the verifying further includes a risk assessment of a digital asset holder of the digital asset, the verifying comprises utilizing one or more machine learning models to predict one or more activities relating to the digital asset, and the verifying further comprises updating the one or more machine learning models based on data collected during the verifying.

8. The method of claim 1, further comprising:
   determining the digital asset is distressed; and
   generating, based on the record, one or more documents to support a claim of ownership of a digital asset holder that the record maps the ownership of the digital asset to.

9. The method of claim 8, wherein the digital asset is distressed if a private key corresponding to the digital asset is lost.

10. The method of claim 8, wherein the digital asset is distressed if the digital asset is under a third-party attack.

11. The method of claim 8, further comprising:
    providing an option to sell the claim of ownership.

12. The method of claim 8, further comprising:
    receiving a notification from a third party of recovery of the digital asset; and
    automatically submitting the documents to the third party to redeem the digital asset.

13. A system comprising:
    at least one processor; and
    a non-transitory processor-readable memory device storing instructions that when executed by the at least one processor causes the at least one processor to perform operations including:
    verifying a digital asset to determine ownership, provenance, and lineage of the digital asset, wherein the verifying includes blockchain forensic analysis and triangulation of one or more electronic devices involved in one or more blockchain transactions relating to the digital asset;

computing a confidence score corresponding to the digital asset, wherein the confidence score is a measurement derived from the verifying;

maintaining a record of the digital asset in an electronic registry, wherein the record includes the confidence score and is indicative of the ownership, the provenance, and the lineage of the digital asset;

monitoring one or more changes to the ownership, the provenance, and the lineage of the digital asset;

updating the record including the confidence score in response to the one or more changes; and generating one or more digital tokens on a blockchain, wherein the one or more digital tokens are deposited into a digital wallet, the one or more digital tokens are tradeable on a digital asset exchange, valuation of the one or more digital tokens is based on the confidence score, and the one or more digital tokens contain information providing proof of the ownership, the provenance, and the lineage of the digital asset for valuation of the digital asset.

14. The system of claim 13, wherein the confidence score is computed based on one or more verification parameters.

15. The system of claim 14, wherein the record further includes the one or more verification parameters, and an affidavit of title of the digital asset.

16. The system of claim 13, wherein the digital asset is monitored on a continuing basis or a periodic basis, the monitoring comprises utilizing one or more machine learning models to predict one or more activities relating to the digital asset, and the monitoring further comprises updating the one or more machine learning models based on data collected during the monitoring.

17. The system of claim 13, wherein the verifying further includes a risk assessment of a digital asset holder of the digital asset, the verifying comprises utilizing one or more machine learning models to predict one or more activities relating to the digital asset, and the verifying further comprises updating the one or more machine learning models based on data collected during the verifying.

18. The system of claim 13, wherein the operations further include:

determining the digital asset is distressed; and generating, based the record, one or more documents to support a claim of ownership of a digital asset holder that the record maps the ownership of the digital asset to.

19. A non-transitory processor-readable medium that includes a program that when executed by a processor performs a method comprising:

verifying a digital asset to determine ownership, provenance, and lineage of the digital asset, wherein the verifying includes blockchain forensic analysis and triangulation of one or more electronic devices involved in one or more blockchain transactions relating to the digital asset;

computing a confidence score corresponding to the digital asset, wherein the confidence score is a measurement derived from the verifying;

maintaining a record of the digital asset in an electronic registry, wherein the record includes the confidence score and is indicative of the ownership, the provenance, and the lineage of the digital asset;

monitoring one or more changes to the ownership, the provenance, and the lineage of the digital asset;

updating the record including the confidence score in response to the one or more changes; and generating one or more digital tokens on a blockchain, wherein the one or more digital tokens are deposited into a digital wallet, the one or more digital tokens are tradeable on a digital asset exchange, valuation of the one or more digital tokens is based on the confidence score, and the one or more digital tokens contain information providing proof of the ownership, the provenance, and the lineage of the digital asset for valuation of the digital asset.

20. The non-transitory processor-readable medium of claim 19, wherein the confidence score is computed based on one or more verification parameters.

* * * * *